United States Patent [19]

Fuller et al.

[11] Patent Number: 4,511,479

[45] Date of Patent: Apr. 16, 1985

[54] OIL REMOVAL FROM WATER SUSPENSIONS USING IONIC DOMAIN POLYMERS

[75] Inventors: Everett J. Fuller, Gillette; Robert D. Lundberg, Bridgewater, both of N.J.

[73] Assignee: Exxon Research and Engineering Company, Florham Park, N.J.

[21] Appl. No.: 463,341

[22] Filed: Feb. 3, 1983

Related U.S. Application Data

[62] Division of Ser. No. 333,130, Dec. 21, 1981, abandoned.

[51] Int. Cl.³ .............................................. C02F 1/54
[52] U.S. Cl. ............................... 210/708; 208/11 LE; 210/711; 210/728; 210/732
[58] Field of Search ................. 208/11 LE, 188; 210/693, 708, 710, 725, 727, 728, 732, 924, 925, 711

[56] References Cited

U.S. PATENT DOCUMENTS

| | | | |
|---|---|---|---|
| 2,356,128 | 8/1944 | Thomas et al. | 525/332.6 |
| 3,280,082 | 10/1966 | Natta et al. | 526/169.2 |
| 3,493,501 | 2/1970 | Eck | 210/732 |
| 3,591,494 | 7/1971 | Crouch et al. | 210/693 |
| 3,642,728 | 2/1972 | Canter | 525/331.8 |
| 3,687,845 | 8/1972 | Treat et al. | 210/737 |
| 3,729,410 | 4/1973 | Abadie et al. | 210/693 |
| 4,028,233 | 6/1977 | Quentin et al. | 210/728 |
| 4,370,238 | 1/1983 | Tackett | 210/639 |

FOREIGN PATENT DOCUMENTS

| | | | |
|---|---|---|---|
| 2208748 | 8/1973 | Fed. Rep. of Germany | 210/727 |
| 50-41354 | 4/1975 | Japan | 210/727 |
| 668884 | 6/1979 | U.S.S.R. | 210/708 |

*Primary Examiner*—Peter Hruskoci
*Attorney, Agent, or Firm*—Richard E. Nanfeldt

[57] ABSTRACT

The instant invention relates to a process for the extraction of oil from an aqueous phase with the use of a sulfonated polymer as an extracting agent.

3 Claims, No Drawings

OIL REMOVAL FROM WATER SUSPENSIONS USING IONIC DOMAIN POLYMERS

This is a division of application Ser. No. 333,130, filed Dec. 21, 1981, now abandoned.

FIELD OF THE INVENTION

The instant invention relates to a process for the extraction of oil from an aqueous dispersion by the use of a sulfonated polymer as an extracting agent.

A number of large-scale petroleum operations, such as the Syncrude process for extracting crude with steam and the hot water extraction of Tar Sands, generate large volumes of water-containing suspended oil. Recovery of the oil is desirable to improve production of oil and to purify water effluent to an environmentally acceptable level.

Various flocculant substances have been proposed to coagulate suspended oil from water. An alternative is to use a surface-active agent, such as activated carbon, to remove suspended oil.

The instant invention demonstrates that heavy crude oil, such as that from tar sands, is rapidly and efficiently removed from suspension in water by contacting with certain partially sulfonated polymer particles. These particles are understood to possess, as characteristic of their molecular structure, certain ionic regions called domains. Being more polar than the main polymer molecule, these domains are subject to interaction with polar groups in the oil, in the water, or in added substances such as n-hexanol. It has also been discovered that there is an unusually strong relationship between the activity of the solid in removing oil from water and this interaction between domains and polar groups, which suggests that even more striking water purification efficiencies than those demonstrated, may be obtainable. An efficient polymer sample has also been compared with powdered, activated carbon on an equivalent weight basis for purifying water of suspended oil. The tests show that the polymer agents of this invention are more easily used than carbon because an excess of polymer floats and associates with the agglomerated oil, while an excess of carbon does not stick to the oil, but instead, forms a secondary suspension of carbon, which may well be more difficult to treat than the original oil in water mixture. This indicates a highly reliable and easily controlled water treatment scheme using the polymer agents.

SUMMARY OF THE INVENTION

The instant invention relates to a process for the extraction of oil from an aqueous dispersion and, more particularly the extraction of oil from the aqueous effluents from the extraction of oil from Tar Sands or from the production of crude with steam. The instant process can be generally described by the steps which comprise adding a mixture of a sulfonated polymer to the dispersion; mixing for a sufficient period of time until the heavy grade oil is substantially extracted from the dispersion, wherein the oil interacts with the neutralized sulfonated polymer, thereby forming two distinct phases which include: the water phase and a phase comprising the oil and the neutralized sulfonated polymer; and separating the phase of oil and neutralized sulfonated polymer from the water phase. The oil can be readily removed from the neutralized sulfonated polymer by a hydrocarbon extraction method or by a vaporization process.

GENERAL DESCRIPTION

This invention relates to a process for removing oil from a water dispersion. The neutralized sulfonated polymers of the present invention are derived from thermoplastic polymers, synthetic elastomeric polymers having olefinic unsaturation sites, wherein the polymer has from about 0.1 to about 10.0 mole percent olefinic unsaturation. The unsaturation sites can be in the polymeric backbone, pendant therefrom, or cyclic. The preferred polymers are synthetic elastomeric polymers which are selected from the group consisting of EPDM terpolymers and Butyl rubbers, wherein EPDM terpolymers are most preferred. However, other low unsaturated elastomeric polymers are also useful and are selected from the group consisting of partially hydrogenated isoprenes, partially hydrogenated polybutadienes, styrene-butadiene copolymers, and isoprene-styrene random copolymers. Also, co- and terpolymers containing sulfonate groups which can be prepared by direct free radical copolymerization of the sulfonate-containing monomer are useful in the instant invention.

The term "EPDM" is used in the sense of its definition, as found in ASTM D-1418-64, and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 45 to about 80 wt. % ethylene and about 1 to about 10 wt. % of a diene monomer, the balance of the polymer being propylene (10 to 54 wt. %). More preferably, the polymer contains about 50 to about 70 wt. % ethylene, e.g., 50 wt. %, and about 2.6 to about 9.0 wt. % diene monomer, e.g., 5.0 wt. %. The diene monomer is preferably a nonconjugated diene. The Mn of the terpolymer, as measured by GPC, is preferably about 10,000 to about 200,000, more preferably about 15,000 to about 100,000, and most preferably about 20,000 to about 60,000. The Mooney viscosity (ML, 1+8, 212° F.) of the terpolymer is preferably 5 to 90, more preferably 10 to 60 and most preferably 15 to 55; e.g., 20. The Mv of the EPDM as measured by GPC is preferably below about 350,000 and more preferably below about 300,000; e.g., 160,000. The Mw of the EPDM as measured by GPC is preferably below about 500,000, and more preferably below about 350,000; e.g., 200,000.

Illustrative of the nonconjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1+8, 212° F.) of about 40 and having 50 wt. % of 5-ethylidene-2-norbornene with an Mn as measured by GPC of about 47,000 and an Mv as measured by GPC of about 145, and an Mw as measured by GPC of about 174,000. The Vistalon 2504 can be reprocessed through an extruder to produce a material (Vistalon 2504-20) having a Mooney viscosity of 20. Vistalon 3708 (Exxon Chemical Co.) is a terpolymer having a Mooney viscosity (ML, 1+8, 212° F.) of about 45 to 55 with an Mn as measured by GPC of about 53,000, an Mw as measured by GPC of about 343,000 and an Mv as measured by GPC of about 270,000. Vistalon 6505 (Exxon Chemical Co.) is a terpolymer having a Mooney viscosity (ML, 1+8, 212° F.) of about 44 to 55 range and having about 53 wt. % of ethylene, about 9.0 wt. % of 5-ethylidene-2-norbornene and about 38 wt. % of propylene. Nordel 1320 (duPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

The expression "Butyl rubber" as employed in the specification and claims, is intended to include copolymers made from a polymerization reaction mixture having from 70 to 99.5% by weight of an isoolefin which has about 4 to about 7 carbon atoms (e.g., isobutylene) and about 0.5 to 30% by weight of a conjugated multiolefin having from about 4 to 14 carbon atoms (e.g., isoprene). The resulting copolymer contains 85 to 99.8% by weight of combined isoolefin and 0.2 to 10% of combined multiolefin, preferably about 0.5 to about 6%, more preferably about 1 to about 4%, e.g., 2%. Butyl rubber generally has a Staudinger molecular weight of about 20,000 to about 500,000, preferably about 25,000 to about 400,000, more preferably 100,000 to about 400,000 and a Wijs Iodine Number of about 0.5 to 50, preferably 1 to 15. The Mooney viscosity (ML, 1+8, 212° F.) of the Butyl rubber is about 5 to about 90, more preferably about 10 to about 60 and more preferably about 15 to about 50. The preparation of Butyl rubber is described in U.S. Pat. No. 2,356,128, which is incorporated herein by reference. Illustrative of Butyl rubber useful in the instant invention is Exxon Butyl 365 (Exxon Chemical Co.), having a mole percent unsaturation of about 2.0% and a Mooney viscosity (ML, 1+8, 212° F.) of about 40 to 50.

The polyaromatic thermoplastics suitable for use in the practice of the invention have a glass transition temperature from about 90° C. to about 150° C., more preferably about 90° C. to about 140° C. and most preferably about 90° C. to about 120° C. These resins have an average molecular weight of about 5,000 to about 500,000, more preferably about 20,000 to about 350,000 and most preferably about 90,000 to about 300,000. These base thermoplastic resins can be prepared directly by any of the known polymerization processes. The term "thermoplastic" is used in its conventional sense to mean a substantially rigid (flexus modulus >10,000 psi) material capable of retaining the ability to flow at elevated temperatures for relatively long times. Especially preferred are polymers having t-butyl styrene incorporated.

The preferred polyaromatic thermoplastic resin is a homopolymer of styrene or t-butyl styrene having a number average molecular weight of about 180,000, and an intrinsic viscosity in toluene of about 0.8. These polymers are commercially widely available in large volume. A suitable material is Dow Polystrene 666 which affords a suitable molecular weight.

The unsaturated or aromatic sites of the thermoplastic polymer or the olefinically unsaturated elastomeric polymer are sulfonated with a sulfonating agent selected from the group consisting of an acyl sulfate, a mixture of sulfuric acid and an acid anhydride or a sulfur trioxide donor complexed with a Lewis base containing oxygen, nitrogen or phosphorous. The term "sulfur trioxide donor" as used in the specification, means a compound containing available sulfur trioxide. Illustrative of such sulfur trioxide donors are $SO_3$, chlorosulfonic acid, fluorosulfonic acid, sulfuric acid, oleum, etc. The term "complexing agent" as used in the specification, means a Lewis base which is an electron pair donor. Typical Lewis bases are: dioxane, tetrahydrofuran, tetrahydrothiophene or triethyl phosphate. The molar ratio of $SO_3$ donor to complexing agent may be as high as 15:1; preferably less than about 9:1, more preferably about 4:1 to about 1:1, e.g., 2:1. The preferred solvents for preparation of the complexes of sulfur trioxide donor with complexing agents are chlorinated hydrocarbons. Illustrative of such chlorinated solvents are carbon tetrachloride, dichloroethane, chloroform and methylene chloride. The complexes may also be prepared by direct addition of reagents if precautions are taken to dissipate evolved heat. The reactions of etheral complexes of $SO_3$ with the unsaturation of polymer chains has been found to be nonquantitative generally because they are consumed through side reactions with impurities such as water. Therefore, the use of excess complex is desirable to give the required amount of sulfonation.

Acyl sulfates, which are suitable sulfonating agents, are selected from the group consisting of acetyl, propionyl, butyryl and benzoyl sulfate, in particular acetyl sulfate. The acyl sulfate may be produced by reacting concentrated sulfuric acid with an acid anhydride or an acid halide in the presence or the absence of a solvent. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, acetyl sulfate may be preformed by reaction of sulfur trioxide with acetic acid in a nonreactive solvent. It should be pointed out that neither the sulfonating agent nor the manner of sulfonation is critical, providing that the sulfonation method does not degrade the polymer backbone. The elastomers to be sulfonated are first dissolved in a suitable solvent and then reacted with the sulfonating agent. The solvent medium must be a neutral one for the rubber and the sulfonating agent. The solvent is preferably an aromatic hydrocarbon, an aliphatic hydrocarbon, a cycloaliphatic hydrocarbon or a halogenated aromatic hydrocarbon. Illustrations of these solvents are: isopentane, pentane, cyclohexane, isohexane, hexane, heptane, and homologues thereof, benzene, toluene, chlorobenzene or xylene. The preferred solvent is an aliphatic hydrocarbon which is especially useful for sulfonation of EPDM.

Sulfonation of the polymer is conducted at a temperature between $-100°$ C. and $+100°$ C. and occurs when the sulfonating agent is added to the polymer solution. The sulfonating agent is dissolved in a suitable solvent or may be added directly without solvent. With acetyl sulfate reagent, it is most preferred to add acetic anhydride to the polymer cement and then sulfuric acid to prepare the acetyl sulfate reagent in situ. Reaction time may be about 1 to about 60 minutes, more preferably about 5 to about 45 minutes and most preferably about 15 to about 30, wherein the product remains soluble throughout the reaction period. The sulfonated elastomer is quenched with water, or a liquid aliphatic alcohol such as methanol, ethanol or isopropanol, an aromatic hydroxyl compound such as phenol, or a cycloaliphatic alcohol such as cyclohexanol. The amount of desirable sulfonation depends on the particular application. Preferably, the elastomeric polymer is sulfonated at about 5 to about 100 meq. unneutralized sulfonate groups per 100 g. of sulfonated polymer, more preferably at about 10 to about 50 meq. sulfonate groups per 100 g. of sulfonated polymer and most preferably at about 10 to about 40 meq. sulfonate groups per 100 g. of sulfonated polymer. The sulfonate content can be determined by either titration of the sulfonated polymer or Dietert Sulfur analysis. In the titration of the sulfonated polymer, the polymer is first dissolved in solvent consisting of 95 parts of toluene and 5 parts of methanol at a concentration level of 50 grams per liter of solvent. The sulfonated polymer is titrated with ethanolic sodium hydroxide to an Alizarin Thymolphthalein end point.

The sulfonated elastomeric polymers have been found to be somewhat deficient in thermal stability. Therefore, it is desirable to neutralize at least a portion of the sulfonated polymer. Neutralization further improves the physical properties of the sulfonated polymer. In preparing the neutralized sulfonated polymer, it is not necessary to neutralize every sulfonated precursor group. Preferably at least 75% of the sulfonated precursor groups are neutralized, though 100% of the sulfonated precursor groups may be neutralized if desired; more preferably about 90 to about 100% of the sulfonated precursor groups are neutralized; most preferably about 95 to about 100% are neutralized. The resultant neutralized sulfonated polymer has about 10 to about 100 meq. neutralized sulfonate groups per 100 grams of neutralized elastomeric sulfonated polymer, more preferably about 15 to about 50 meq. neutralized sulfonate groups per 100 grams of neutralized sulfonated elastomeric polymer and most preferably about 20 to about 40 meq. neutralized sulfonate groups per 100 grams of neutralized sulfonated elastomeric polymer.

A preferred class of neutralizing agents of the present invention are basic salts of carboxylic acids, wherein the cation of the basic salt is selected from the group consisting of ammonium and metal ions of Groups IA, IIA, IB, and IIB and aluminum, lead, iron and antimony of the Periodic Table of Elements and mixtures thereof. Suitable monovalent metal ions are: Na, K, Li, Cs, Ag, Hg and Cu. Suitable divalent metal ions are: Be, Mg, Ca, Sr, Ba, Cu, Cd, Hg, Pb, Fe, Hg and Zn. The carboxylate group of the metallic salt has about 2 to 30 carbon atoms, more preferably about 2 to 20. Nonlimiting examples of carboxylic acids which are useful are: acetic, benzoic, lauric, palmitic, myristic, decanoic, octanoic, and stearic. Neutralization can also be effected with metallic oxides wherein the metallic ion is selected from the group consisting of Groups IIA, IIB and lead and mixtures thereof of the Periodic Table of Elements. Illustrative examples are MgO, CaO, BaO, ZnO, PbO$_2$, or Pb$_3$O$_4$ and mixtures thereof. Other useful neutralizing agents are hydroxides or alkoxides having 1 to 8 carbon atoms, wherein the cation is selected from ammonium and metal ions of Groups IA and IIA of the Periodic Table of Elements and mixtures thereof. Useful examples of hydroxides are: NH$_4$OH, NaOH, KOH, LiOH, Mg(OH)$_2$ and Ba(OH)$_2$. Alternatively, less preferred neutralizing agents are aliphatic amines, as defined in U.S. Pat. No. 3,642,728, incorporated herein by reference.

To the neutralized sulfonate terpolymer in solution can be added a preferential plasticizer selected from the group consisting of carboxylic acids or metal salts of these carboxylic acids and mixtures thereof, wherein the metal cation of the salt of the carboxylic acid is selected from the group consisting of lead, iron, antimony, aluminum and Groups IA, IIA, IB and IIB of the Periodic Table of Elements thereof, and the carboxylic acid has about 8 to about 22 carbon atoms. The preferential plasticizer which has a melting point of above about 25° C. is incorporated into the neutralized sulfonated elastomeric polymer at about 1 to about 60 parts by weight per hundred parts by weight of the neutralized sulfonated elastomeric polymer, more preferably at about 8 to about 45, and most preferably at about 10 to about 50. Other preferential plasticizers useful in the instant invention are selected from amides having an alkyl group containing about 10 to 22 carbon atoms such as stearamide, ureas, and thioureas and mixtures thereof.

DETAILED DESCRIPTION

The advantages of the improved process of the instant invention can be more readily appreciated by reference to the following examples.

EXAMPLE 1

Experimental demonstrations of the property of certain of the ionic domain polymers to clarify water containing suspended oil is illustrated in Table I. In these tests, 2 g. of heavy bitumen was initially shaken for 2 minutes in a 4 oz. bottle with 80 ml of water to produce a suspension. The stated amount of solid additive was then added and the bottle was shaken for 5 more minutes. Finally, a weighed sample of the aqueous phase was evaporated to dryness to remove water, and the residue weight was obtained (the bitumen was chosen for non-volatility at the conditions required to evaporate water).

TABLE I

Screening of Solids for Suspension Treating

| Test | Additive | Wt. Additive | Wt. Water Sample | Wt. Residue | Final Oil in Water |
|---|---|---|---|---|---|
| A-R | None | 0 | 63.7225 g. | 0.0689 g. | 1081 ppm |
| B | Zinc Stearate | 0.06 g. | 59.8929 | 0.0255 | 426 |
| C | Stearic Acid | 0.06 | 64.2006 | 0.0477 | 743 |
| D | 303 | 0.06 | 55.8119 | 0.0222 | 398 |
| E | 303 | 1.0 | 62.7846 | 0.0176 | 280 |
| F | 202 | 1.0 | 63.4159 | 0.0003 | 5 |
| G | 301 | 1.0 | 62.3568 | 0.0194 | 311 |
| H | 2842-11 | 1.0 | 64.4840 | 0.0157 | 243 |
| I | Stearic Acid 201 | 1.0 | 65.3038 | 0.0370 | 567 |

The additives of tests D through H are polymeric derivatives. Their nature and that of a similar additive, 201, is shown in Table II.

TABLE II

Polymer Derivatives

| Substance | |
|---|---|
| 201 | Polymer is a sulfonated EPDM derived from a depolymerized 40 Mooney (50% ethylene) polymer to yield EPDM with a Mooney level of 20 sulfonated to about 33 meq. of sulfonic acid per 100 gm EPDM and neutralized with 70 meq. zinc acetate with 90 meq. of stearic acid added as plasticizer. |
| 202 | Same as 201 except that 70 meq. zinc acetate added to neutralize polymer followed by 45 meq. of stearic acid. |
| 301 | Derived from an EPDM having an ethylene content of 70%, a Mooney level of about 20, sulfonated to about 30 meq. of sulfonic acid, neutralized with 120 meq. of zinc acetate with 30 meq. of stearic acid added. (Zinc stearate is present, no free stearic acid.) |

TABLE II-continued

Polymer Derivatives

| Substance | |
|---|---|
| 303 | Derived from an EPDM of 20 Mooney and about 56% ethylene, sulfonated to a level of about 30 meq., neutralized with 70 meq. of zinc acetate; no plasticizer. |
| 2842-11 | Lightly sulfonated polystyrene (sodium salt) prepared by sulfonated polystyrene of number average molecular weight of 140,000 to about 2 mole percent. |

The polymer samples (201, 202, 301, 303) are sulfonated elastomers having an approximate zinc sulfonate level of from 30 to 33 milliequivalents per 100 grams polymer, or about 1 mole percent. The sample 2842-11 is a lightly sulfonated polystyrene with about 2 mole percent sodium sulfonate. These materials are all characterized as having strong ionic associations present which act as physical cross-links. In the case of 201 sample, the presence of 90 meq. stearic acid is believed to act as a plasticizer to selectively weaken the ionic associations, especially at elevated temperatures. In this case the stearic acid may be accompanied by some zinc stearate formed during the neutralization/plasticization preparative step. Similarly, sample 202 has less stearic acid present, while sample 301 has only zinc stearate present due to the conditions of the neutralization/plasticization steps.

The action of these plasticizers is an important facet of this sulfonate ionomer technology. If too much plasticizer is present, it is possible to over plasticize the sulfonate groups such that they no longer manifest the degree of physical cross-linking useful for a particular application. Alternatively, if insufficient plasticizer is present, then the degree of ionic cross-linking may be too great for the intended application. Therefore, for a given sulfonate ionomer, at a given temperature, the amount and type of plasticizer is an important factor governing these ionic associations. Such plasticizers can be liquid or solid.

It is evident that a marked improvement in cleanup of the suspension was demonstrated by the 202 derivative, while solids, which are compositionally very similar, (201, 301, and 303) were much less effective. This suggests that only appropriately modified ionic interactions have a powerful effect on the suspension treatment, and that the addition of an appropriate modifier might affect the efficiency of a given solid.

The solids of Table II are all insoluble in xylene. The agglomerates of oil and solid may, therefore, be regenerated in a process scheme by simple washing with a light paraffin hydrocarbon to remove oil, followed by paraffin removal, i.e., with heat or steam.

The above results show that use of such polymers to purify suspensions of oil-in-water is efficient and rapid. The adjustment of efficiency by appropriate manipulation of ionic or polar interactions in the polymer has been demonstrated, but by no means can it be concluded that any of the few systems so far examined are optimized. This invention is a potentially powerful method for suspension treating, involving the fine tuning of polymer domain interactions to maximize a desirable phenomenon.

What is claimed is:

1. A process for the purification of water containing emulsified oil particles which consists essentially of the steps of:
    (a) adding sufficient amounts of neutralized sulfonated polymer to said water containing said emulsified oil particles to have said neutralized sulfonated polymer interact with said oil particles, wherein said neutralized sulfonated polymer is a elastomer polymer selected from the group consisting of EPDM terpolymer and Butyl rubber, and has about 5 to about 50 meq. of sulfonate groups per 100 grams of said neutralized sulfonated polymer, and about 1 to about 60 parts by weight per hundred parts by weight of said neutralized sulfonated polymer of a preferential plasticizer selected from the group consisting of carboxylic acids having about 8 to about 22 carbon atoms and metallic salts of said carboxylic acids having about 8 to about 22 carbon atoms, incorporated therein
    (b) stirring the mixture of said neutralized sulfonated polymer and said water containing said emulsified oil particles for a sufficient period of time to cause interaction of said oil particles with said neutralized sulfonated polymer, said oil particles and said neutralized sulfonated polymer separating from said water as a distinct oil/neutralized polymer layer; and
    (c) separating said water layer from said oil/neutralized sulfonated polymer layer.

2. A process according to claim 1, wherein said sulfonated groups are neutralized with a counterion being selected from the group consisting of iron, aluminum, antimony, Group IA, IIA, IB and IIB of the Periodic Table of Elements.

3. A process according to claim 1 further including separating said oil from said neutralized sulfonated polymer.

* * * * *